United States Patent
Jo

(10) Patent No.: US 11,751,744 B2
(45) Date of Patent: Sep. 12, 2023

(54) MOVING ROBOT AND CONTROLLING METHOD

(71) Applicant: LG ELECTRONICS INC., Seoul (KR)

(72) Inventor: Wonchul Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 722 days.

(21) Appl. No.: 16/650,527

(22) PCT Filed: Sep. 21, 2018

(86) PCT No.: PCT/KR2018/011344
§ 371 (c)(1),
(2) Date: Mar. 25, 2020

(87) PCT Pub. No.: WO2019/066444
PCT Pub. Date: Apr. 4, 2019

(65) Prior Publication Data
US 2020/0275814 A1    Sep. 3, 2020

(30) Foreign Application Priority Data

Sep. 26, 2017 (KR) .......................... 10-2017-0124514

(51) Int. Cl.
*A47L 9/28* (2006.01)
*A47L 9/00* (2006.01)
*A47L 9/04* (2006.01)

(52) U.S. Cl.
CPC ............... *A47L 9/281* (2013.01); *A47L 9/009* (2013.01); *A47L 9/2852* (2013.01);
(Continued)

(58) Field of Classification Search
CPC ........ A47L 9/281; A47L 9/009; A47L 9/2894; A47L 2201/04; A47L 2201/06
See application file for complete search history.

(56) References Cited

U.S. PATENT DOCUMENTS

| 7,805,220 B2* | 9/2010 | Taylor ................. G05D 1/0219 318/568.17 |
| 2012/0222224 A1* | 9/2012 | Yoon ..................... G05D 1/021 15/52.1 |
| 2019/0029486 A1* | 1/2019 | Suvarna ............. A47L 11/4061 |

FOREIGN PATENT DOCUMENTS

| JP | 2005-205028 A | 8/2005 |
| JP | 2012-147906 A | 8/2012 |

(Continued)

OTHER PUBLICATIONS

European Search Report, dated Mar. 24, 2021, issued in European Patent Application No. 18863353.1 (7 pages).

(Continued)

*Primary Examiner* — Marc Carlson
(74) *Attorney, Agent, or Firm* — Birch, Stewart, Kolasch & Birch, LLP

(57) ABSTRACT

A moving robot and a controlling method thereof are disclosed. The moving robot includes a dust sensor that detects dust in air suctioned during cleaning, and a controller that performs control so that the robot performs cleaning while traveling over a traveling area distinguished into a plurality of regions. The controller stores, in the data unit, dust information detected by the dust sensor and a number of times of cleaning in each region. The controller also sets a cleaning region and a non-cleaning region based on cleaning data, which is calculated based on the dust information and the number of times of cleaning. This helps prevent cleaning from being repeated unnecessarily and allows for cleaning depending on the number of times of cleaning, despite a small amount of dust. Accordingly, an entire indoor area may be maintained in a constant clean state and cleaning efficiency may be enhanced.

18 Claims, 11 Drawing Sheets

(52) U.S. Cl.
CPC ........... *A47L 9/2894* (2013.01); *A47L 9/0466* (2013.01); *A47L 2201/04* (2013.01); *A47L 2201/06* (2013.01)

(56) References Cited

FOREIGN PATENT DOCUMENTS

| | | |
|---|---|---|
| JP | 2017-143983 A | 8/2017 |
| KR | 10-0679893 | 2/2007 |
| KR | 10-2012-0016859 A | 2/2012 |
| KR | 10-2012-0100682 A | 9/2012 |
| KR | 10-2016-0089835 A | 7/2016 |

OTHER PUBLICATIONS

PCT Search Report, dated Jan. 10, 2019, issued in PCT International Patent Application No. PCT/KR2018/011344 (3 pages).

\* cited by examiner

[Fig. 1]
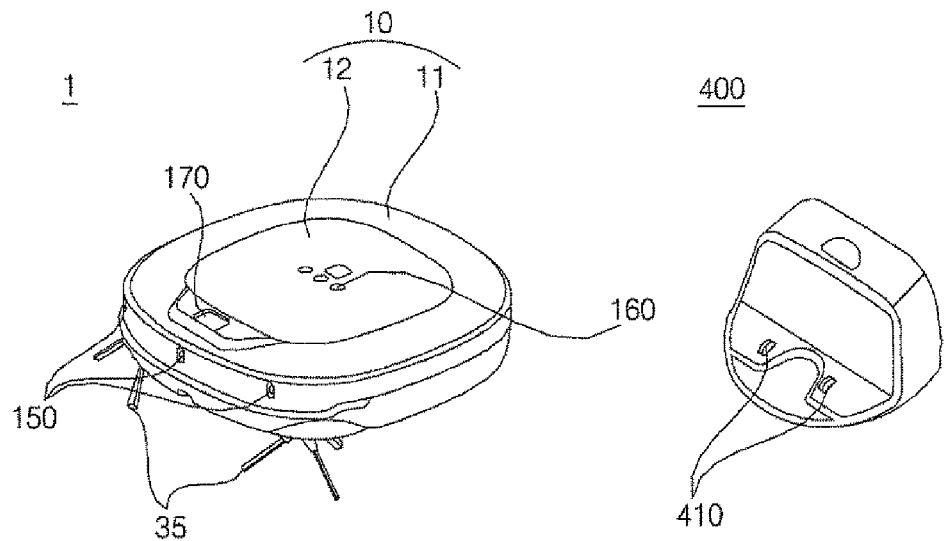
(a)
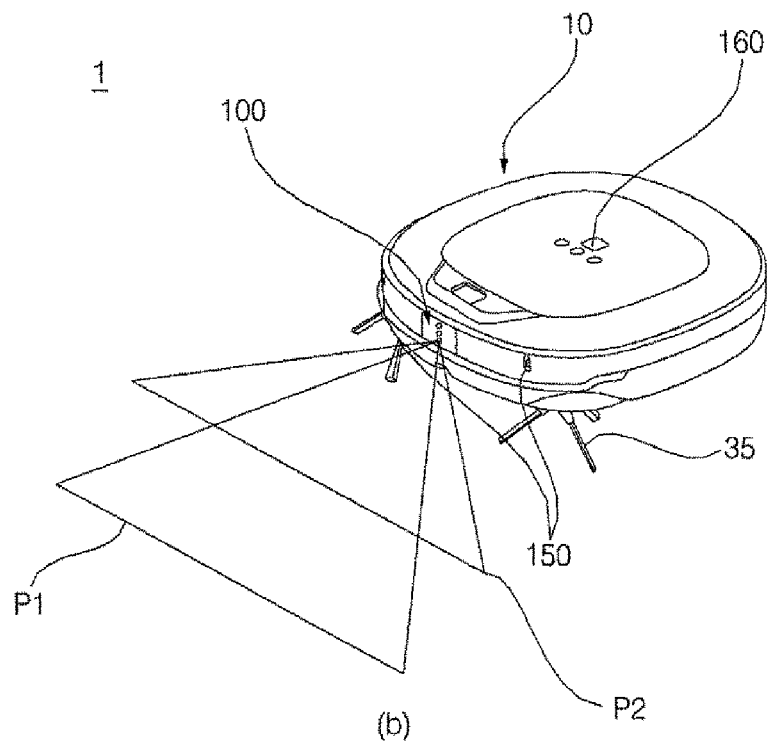
(b)

[Fig. 2]
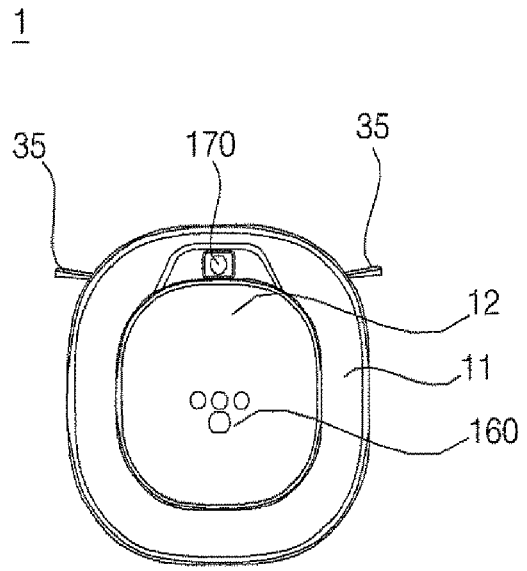
(a)
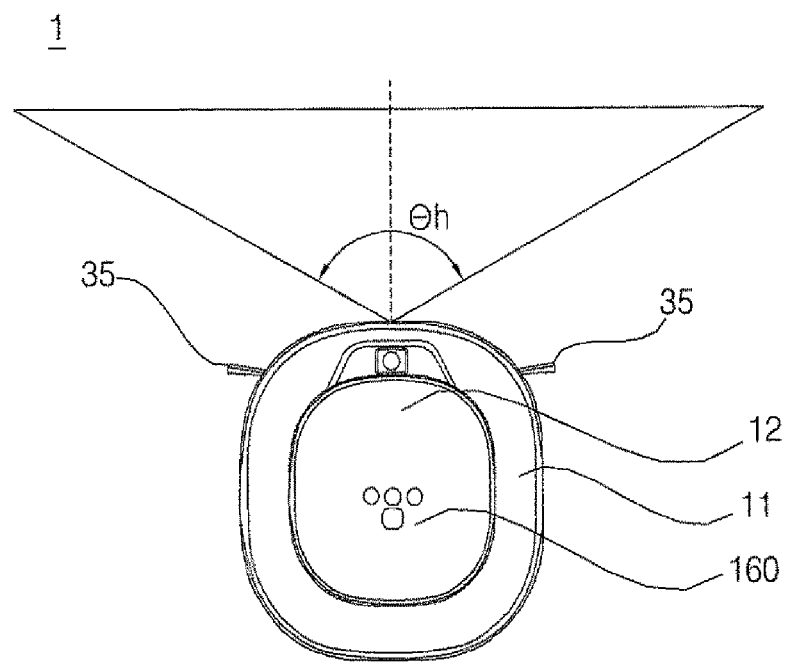
(b)

[Fig. 3]
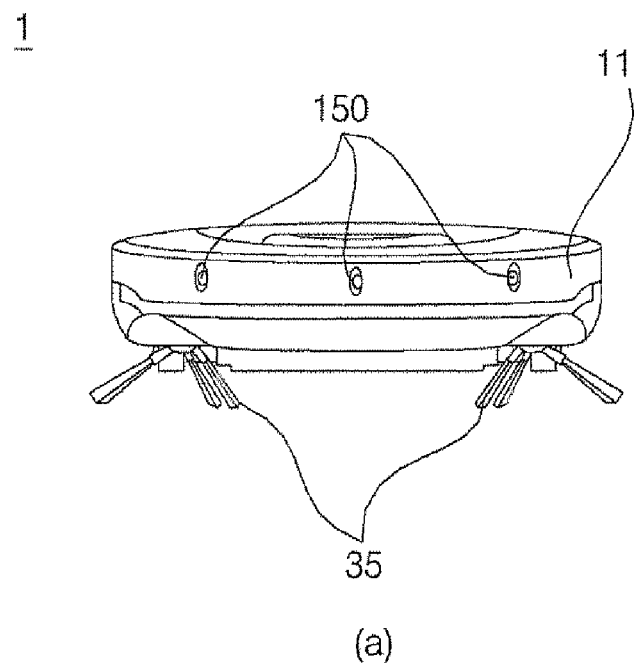
(a)
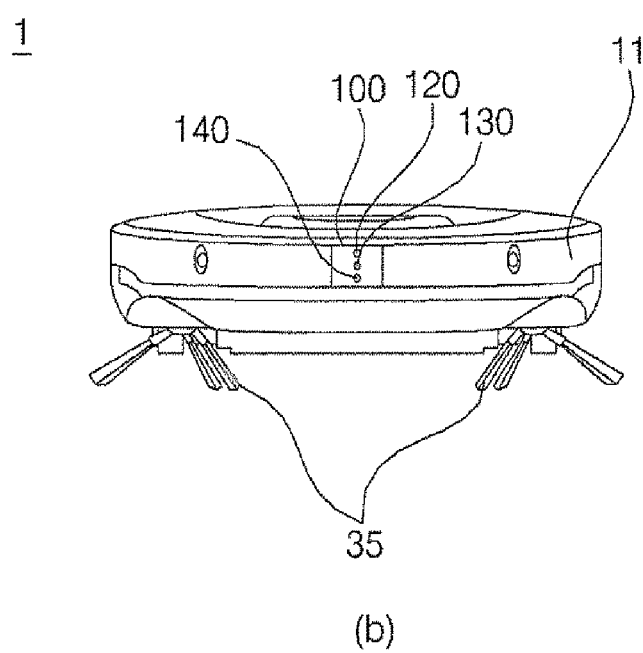
(b)

[Fig. 4]
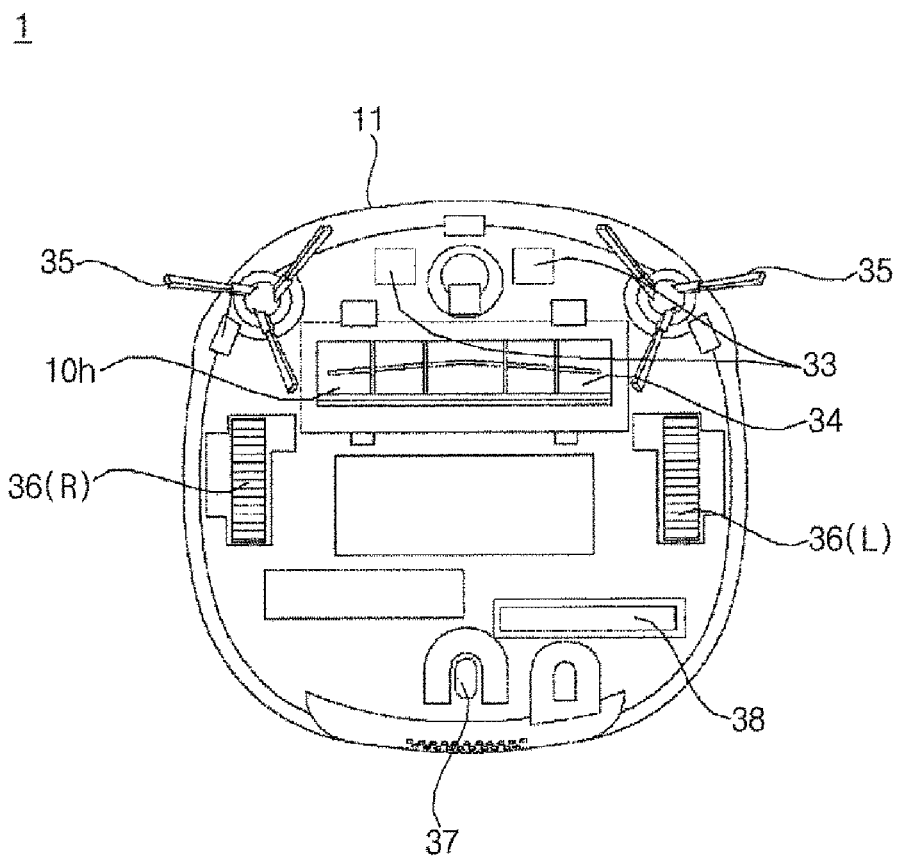

[Fig. 6]
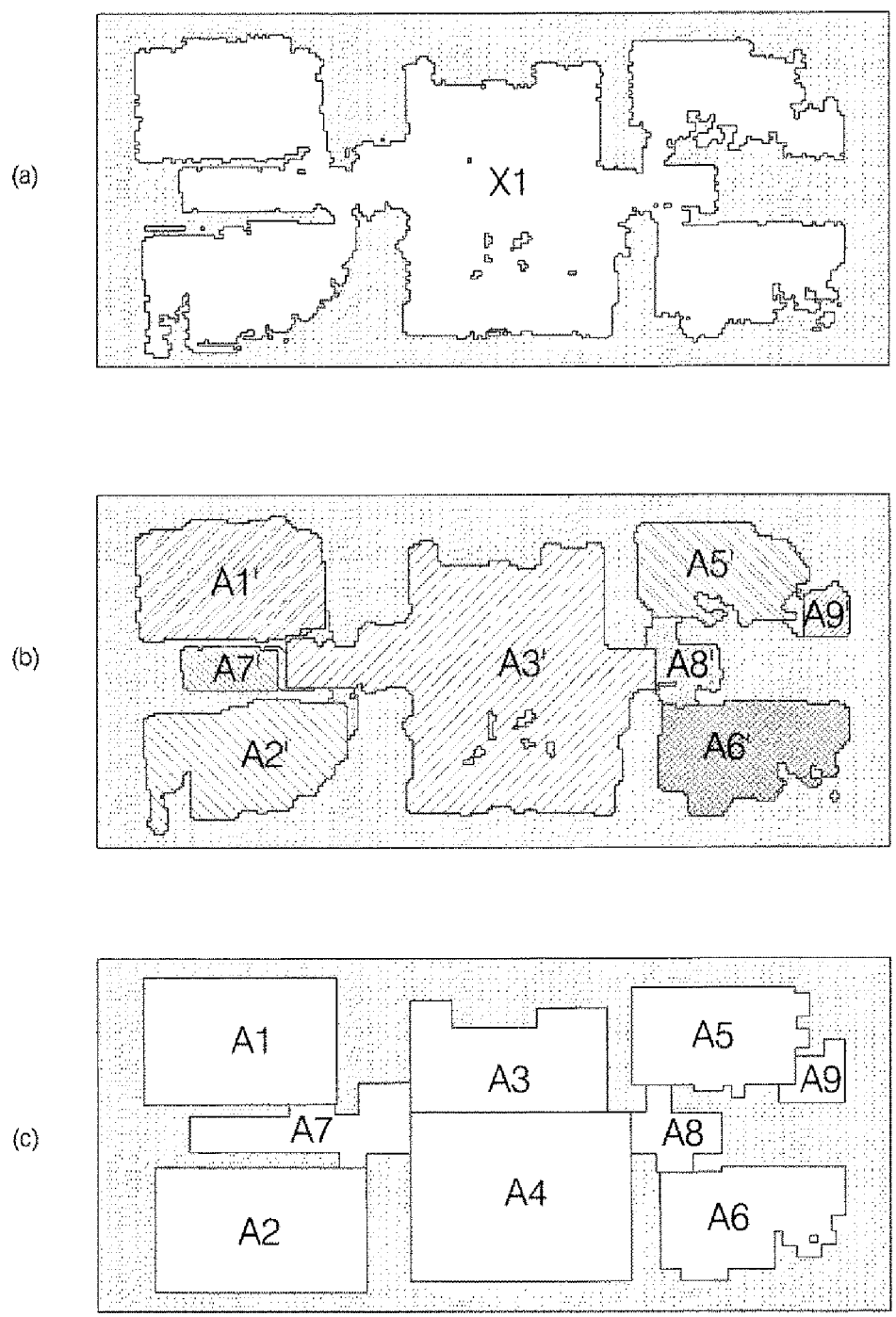

[Fig. 7]
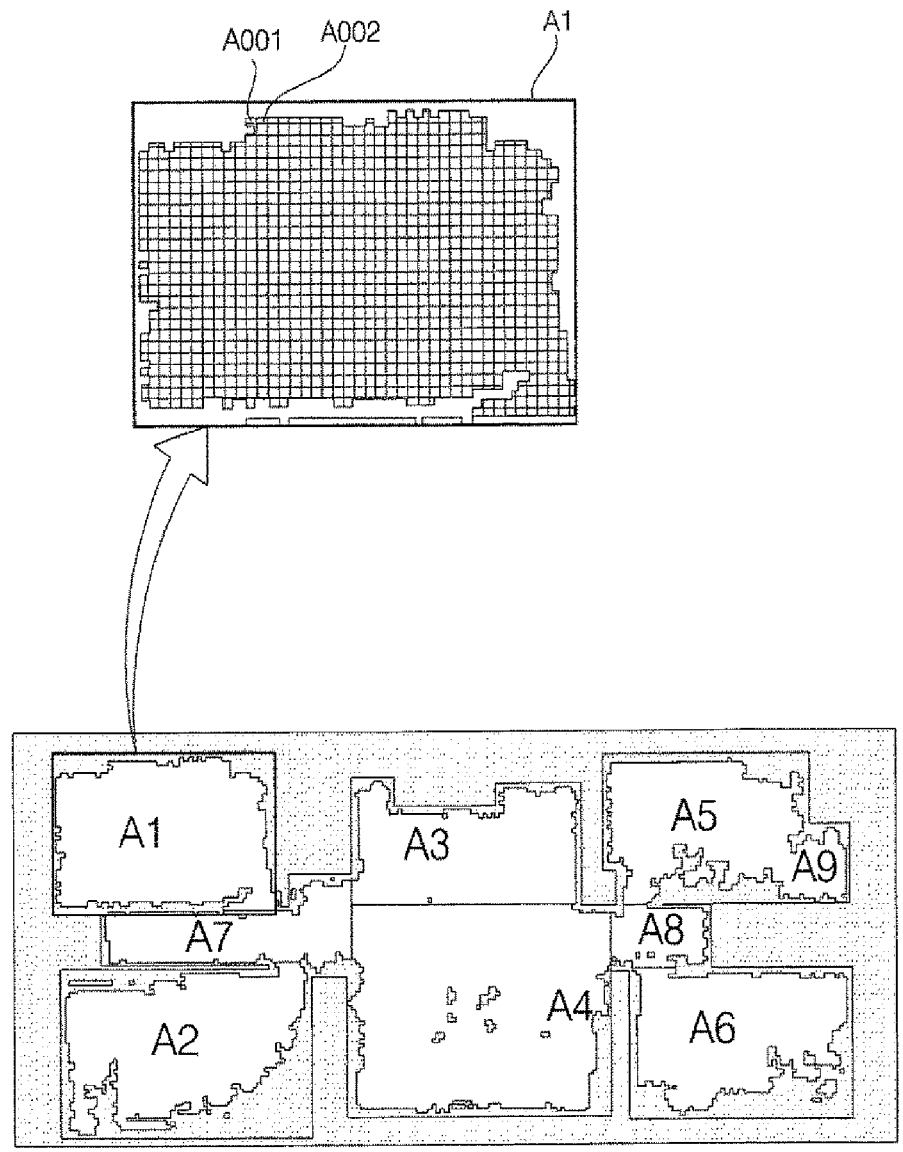

[Fig. 8]
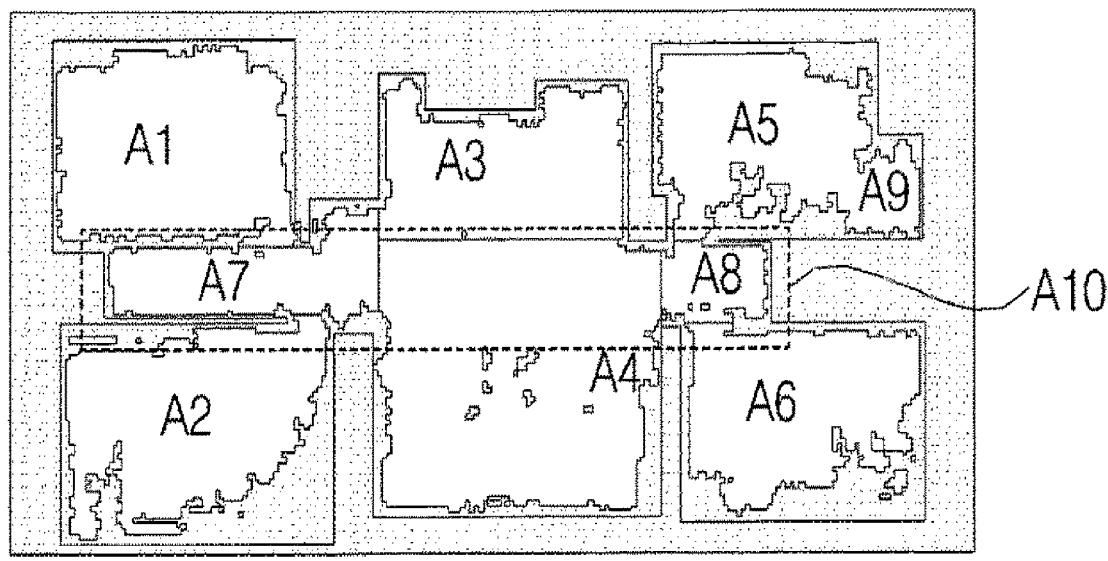
[Fig. 9]
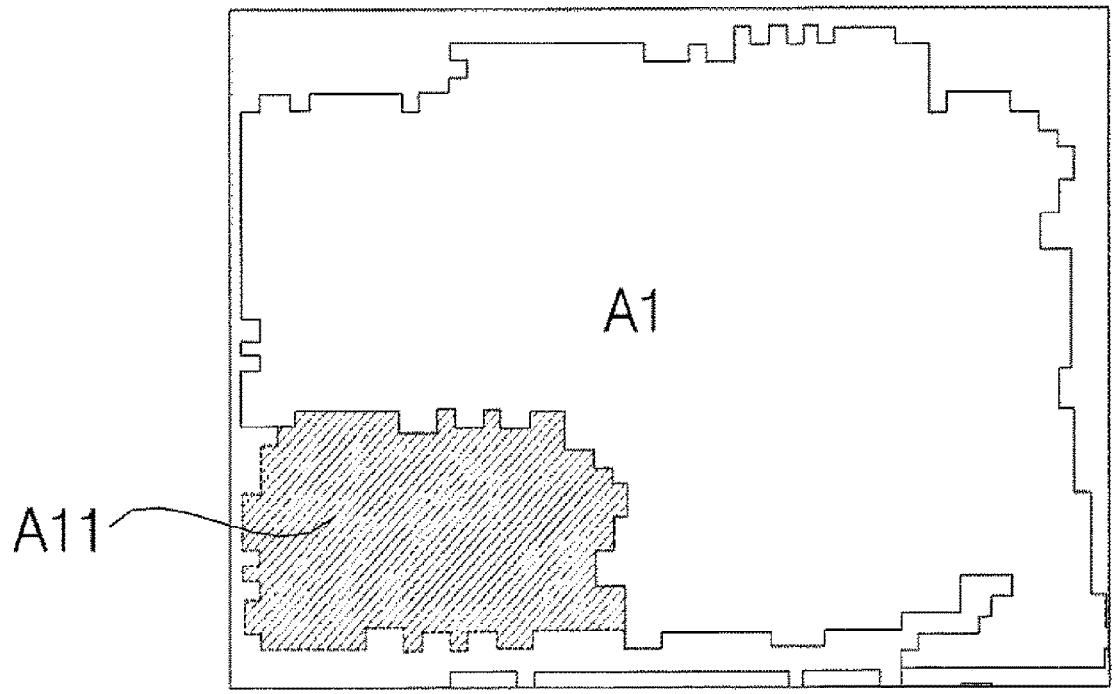

[Fig. 10]
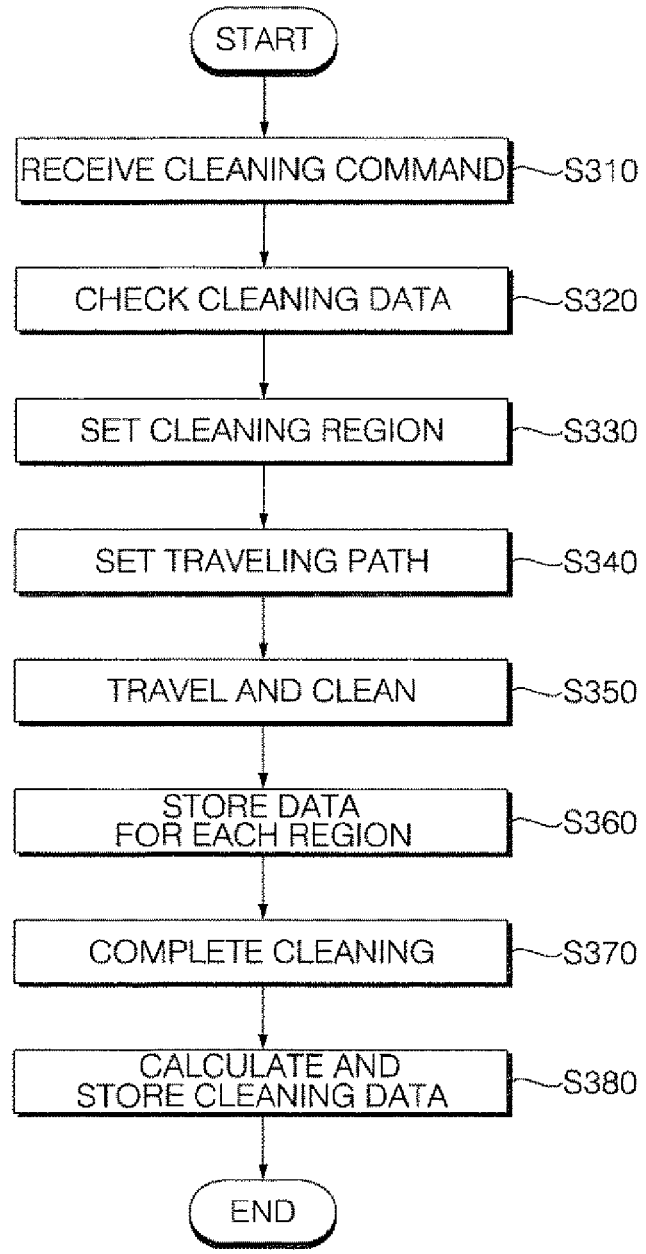

[Fig. 11]
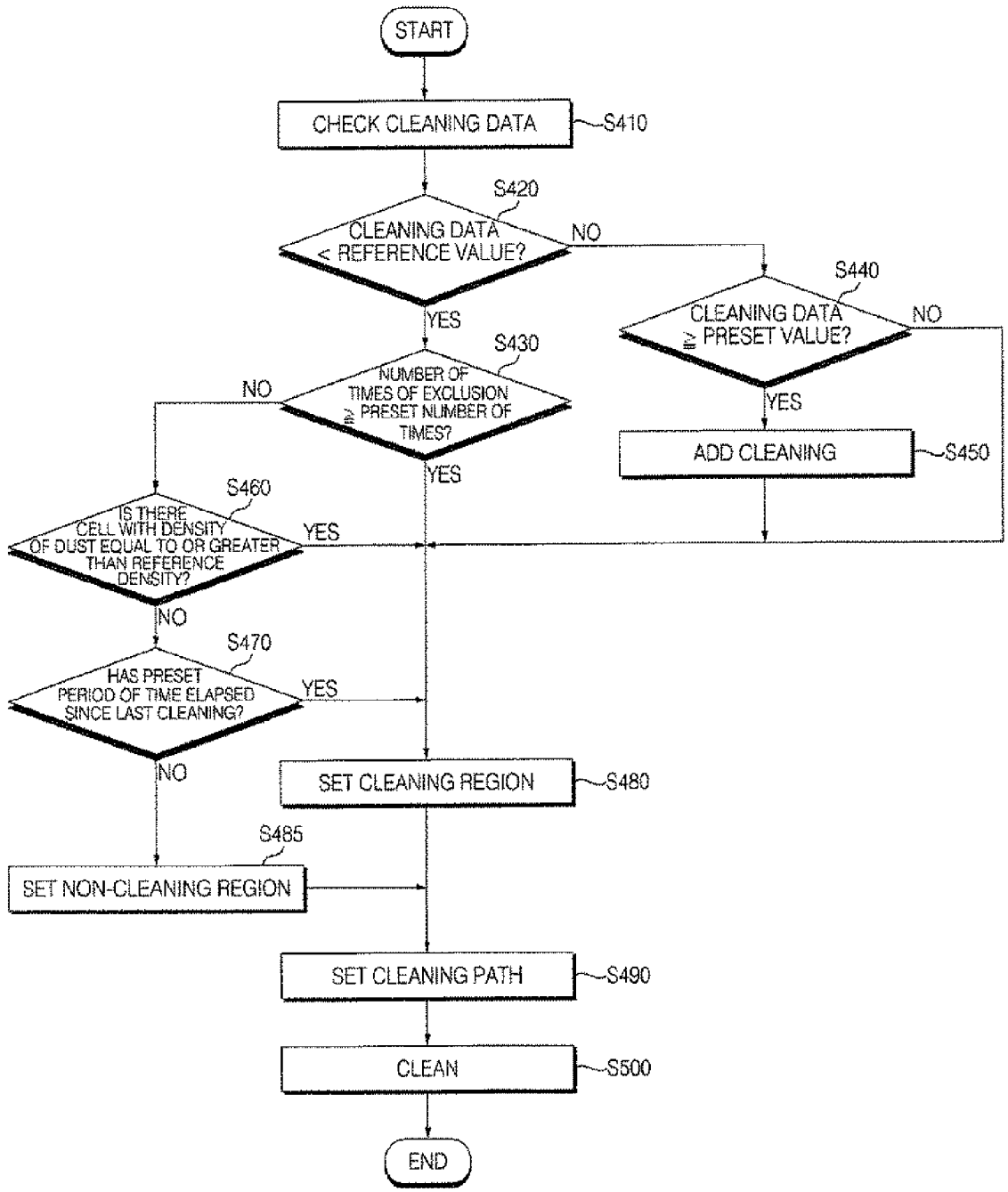

[Fig. 12]
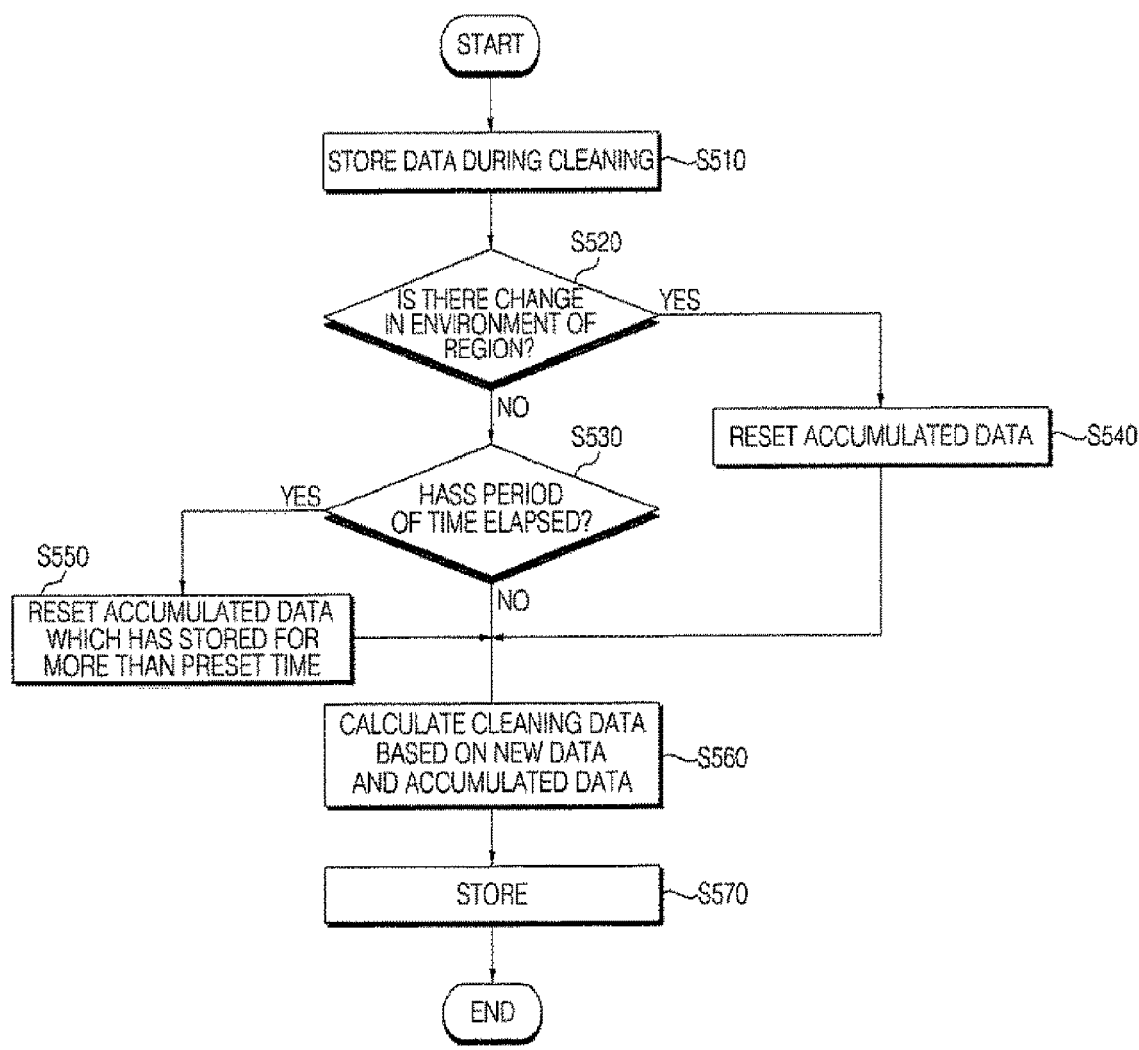

MOVING ROBOT AND CONTROLLING METHOD

TECHNICAL FIELD

The present disclosure relates to a moving robot and a controlling method thereof, and, particularly, a moving robot which performs cleaning by traveling in a cleaning region and a controlling method thereof.

BACKGROUND

A moving robot is an apparatus that automatically performs cleaning by suctioning foreign substances, such as dust, from a floor of an area to be cleaned.

The moving robot may sense distances to an obstacle, such as furniture, office equipment, and walls, in a cleaning region and maneuver to avoid the obstacle.

The moving robot generates a map while traveling in a region, and travels based on the map when performing cleaning, so that all regions are prevented from being left uncleaned, and the moving robot tends to store information on an obstacle detected during the cleaning.

The moving robot may be in a messy and dusty region depending on an indoor environment, and thus, it is necessary for the moving robot to perform cleaning in response to the messy and dusty condition, but it is difficult to reflect such indoor environment in the cleaning operation.

In order to address this drawback, Korean Patent Application No. 20110032346A (Apr. 7, 2011) discloses a robot cleaner which generates a cleaning map by searching for a cleaning region and displays a contaminant degree on the map.

However, although the robot cleaner displays the contaminant degree, a change in contamination in a target region due to cleaning is not displayed, and therefore, there is a limitation in cleaning control.

In addition, as the order in which cleaning is to be performed is set merely based on a degree of contamination, a relatively highly contaminated region is cleaned repeatedly and thus redundant cleaning is performed unnecessarily and a relatively less contaminated region is excluded from the cleaning operation.

That is, cleaning is performed merely based on a degree of contamination, resulting in an increased cleaning time, and, in particular, a particular region is excluded from the cleaning and thus the whole regions may not be cleaned evenly.

SUMMARY

Technical Problem

The present disclosure provides a moving robot and a controlling method thereof, in which a contamination level of each cleaning region is determined indoor, wherein a region is set as a cleaning region in consideration of the number of times the corresponding region was cleaned and therefore it is possible to clean the entire indoor area while preventing cleaning the same region from being cleaned unnecessarily.

Technical Solution

In one general aspect of the present disclosure, there is provided a moving robot including: a movable main body; a travel drive unit configured to move the main body; a data unit configured to store data for each region; a dust sensor configured to detect dust in air suctioned during cleaning; and a controller configured to control the travel drive unit so as to perform cleaning while traveling in a traveling area distinguished into a plurality of regions, wherein the controller is further configured to: store, in the data unit, dust information detected by the dust sensor and a number of times of cleaning in each region; and set a cleaning region and a non-cleaning region based on cleaning data, which is calculated based on the dust information and the number of times of cleaning, so as to perform cleaning of the cleaning region.

The controller may be further configured to: distinguish each region allowed for traveling in the plurality of regions into cells of a predetermined size; store, as the dust information, a number of cells in each region and a number of cells where dust is detected by the dust sensor; calculate the cleaning data based on a number of cells in each region, a number of cells where the dust is detected, and a number of times of cleaning.

The controller may be further configured to; when the cleaning data has a value equal to or greater than a reference value, set a region as a cleaning region; and, when the cleaning data has a value smaller than the reference value, set the region as a non-cleaning region.

In another general aspect of the present disclosure, there is provided a controlling method of a moving robot, the method including: receiving a cleaning command with respect to a traveling area divided into a plurality of regions; checking cleaning data which is calculated based on a number of times of cleaning in each region and dust information; setting a cleaning region and a non-cleaning region by comparing the cleaning data with a reference value; performing cleaning of the cleaning region while traveling; storing dust information by detecting dust in air suctioned during cleaning; and updating the cleaning data based on the number of times of cleaning in each region and the dust information.

The method may further include, before setting a region as the non-cleaning region in a case where the cleaning data has a value smaller than the reference value, setting the region as a cleaning region when at least one of the following conditions is met: the region has been set as the non-cleaning region a preset number of times or more; there is a cell with a density of dust equal to or greater than a reference density; and a preset time has elapsed since last cleaning.

Advantageous Effects

A moving robot and a controlling method thereof according to the present disclosure may enable detecting a density of dust detected by the moving robot while traveling, counting the number of times of cleaning in each region, and calculating cleaning data for each region so as to set a next cleaning region for a next cleaning operation.

The moving robot of the present disclosure sets a cleaning region based on cleaning data to thereby prevent cleaning from being unnecessarily repeatedly performed, and allows cleaning to be performed based on the number of times of cleaning despite a small amount of dust, and therefore, there are the advantages that the entire indoor area is maintained in a uniform clean state and cleaning efficiency is enhanced.

In addition, the moving robot of the present disclosure performs cleaning by distinguishing an indoor area into a plurality of regions, and accurately determines an amount of dust by detecting an amount of dust in each region on a per cell basis, wherein it is possible to perform cleaning based on an amount of dust in each cell even when the regions are not allowed to be distinguished.

BRIEF DESCRIPTION OF THE DRAWINGS

FIGS. 1(a) and 1(b) are perspective views of a moving robot according to an embodiment of the present disclosure.

FIGS. 2(a) and 2(b) are horizontal angled views of the moving robot shown in FIGS. 1(a) and 1(b).

FIGS. 3(a) and 3(b) are front views of the moving robot shown in FIGS. 1(a) and 1(b).

FIG. 4 is a bottom view of the moving robot shown in FIGS. 1(a) and 1(b).

FIG. 6 is a diagram illustrating an example of how to generate a map and distinguish regions by a moving robot according to an embodiment of the present disclosure.

FIG. 7 is a diagram referred to for explaining how to distinguish cells in each region by a moving robot according to an embodiment of the present disclosure.

FIG. 8 is a diagram referred to for explaining a detection method in response to movement of a moving robot according to an embodiment of the present disclosure.

FIG. 9 is a diagram referred to for explaining a change in environment of a region with respect to a moving robot according to an embodiment of the present disclosure.

FIG. 10 is a flowchart illustrating a cleaning method of a moving robot according to an embodiment of the present disclosure.

FIG. 11 is a flowchart illustrating a method of setting a cleaning region by a moving robot according to an embodiment of the present disclosure.

FIG. 12 is a flowchart illustrating a method of updating data by a moving robot according to an embodiment of the present disclosure.

DESCRIPTION

Figure 5:
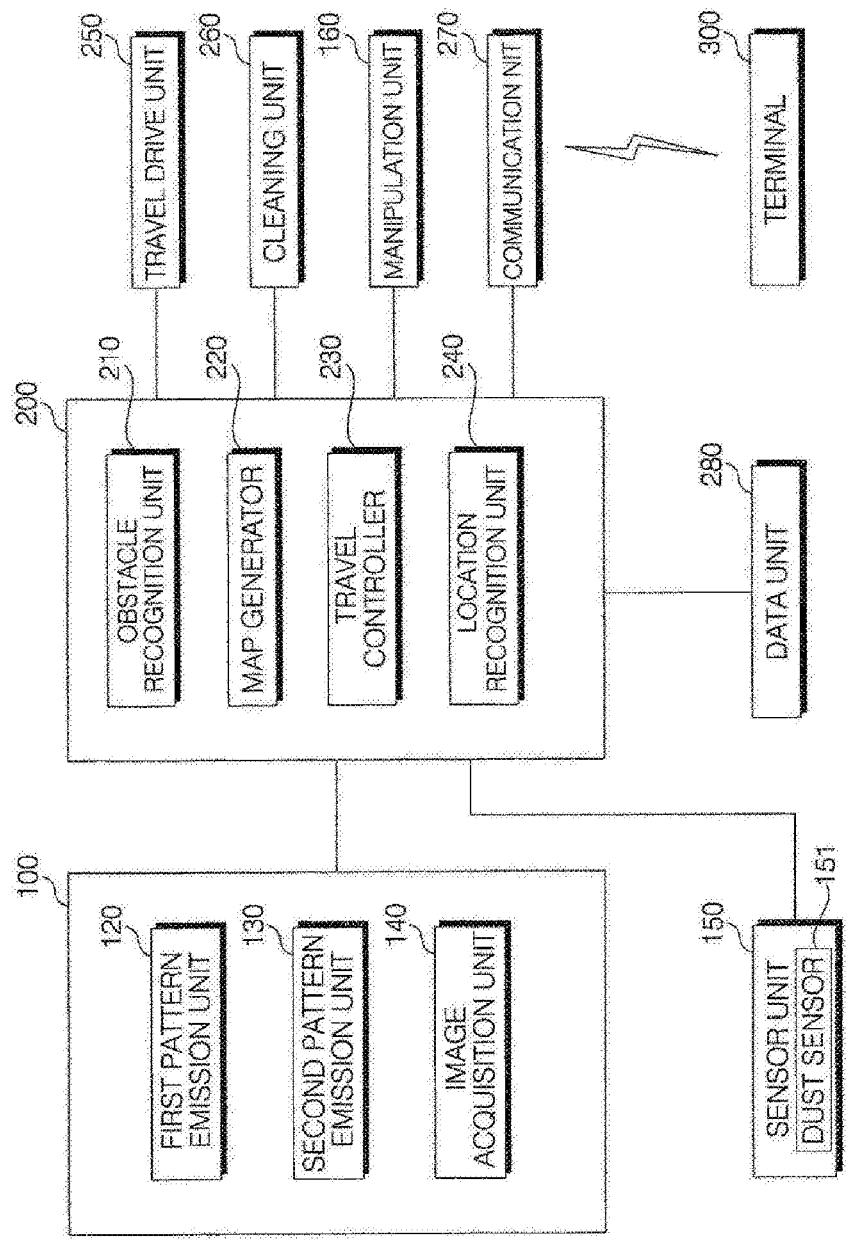
FIG. 5 is a block diagram illustrating major components of a moving robot according to an embodiment of the present disclosure.

Advantages and features of the moving robot of the present disclosure and a method of cleaning using the same will be clearly understood from embodiments described below in detail with reference to the accompanying drawings. However, the present disclosure is not limited to the following embodiments and may be implemented in various different forms, and the embodiments are provided merely for complete description of the present disclosure and to fully convey the scope of the disclosure to those of ordinary skill in the art to which the present disclosure pertains, and the present disclosure is defined only by the scope of the claims. Throughout the present disclosure, like numbers refer to like elements. A control component in the present disclosure may be configured as at least one processor.

FIGS. 1(a) and 1(b) are perspective views of a moving robot according to an embodiment of the present disclosure. FIGS. 2(a) and 2(b) are horizontal angled views of the moving robot shown in FIGS. 1(a) and 1(b). FIGS. 3(a) and 3(b) are front views of the moving robot shown in FIGS. 1(a) and 1(b). FIG. 4 is a bottom view of the moving robot shown in FIGS. 1(a) and 1(b).

Referring to FIGS. 1(a) to 4, a moving robot 1 according to an embodiment of the present disclosure includes a main body 10 traveling on a floor a cleaning area to suction foreign substances such as dust on the floor, and a detection means provided on the front surface of the main body 10 to detect an obstacle.

The main body 10 may include: a casing 11 which defines an external appearance of the main body 10 and internally defines a space in which constituent elements of the main body 10 are accommodated; a suction unit 34 which is provided in the casing 11 to suction foreign substances such as dust or trash; and a left wheel 36L and a right wheel 36R which are rotatably provided on the casing 11. The main body 10 travels on the floor of the cleaning area in response to rotations of the left wheel 36L and the right wheel 36R, and, in this process, foreign substances are suctioned through the suction unit 34.

The suction unit 34 may include: a suction fan (not illustrated) which generates suction force; and a suction port 10h through which an air stream generated by the rotation of the suction fan is suctioned. The suction unit 34 may further include: a filter (not illustrated) which collects foreign substances from the air stream suctioned through the suction port 10h; and a foreign substance collection container (not illustrated) in which the foreign substances collected by the filter accumulate.

In addition, the main body 10 may include a travel unit which drives the left wheel 36L and the right wheel 36R. The travel unit may include at least one drive motor. At least one drive motor may include a left-wheel drive motor for rotating the left wheel 36L, and a right-wheel drive motor for rotating the right wheel 36R.

As the left-wheel drive motor and the right-wheel drive motor are controlled by a travel controller of a controller to operate independently, the main body 10 may travel forward in a straight, travel backward, or rotate. For example, when the main body 10 travels forward, the left-wheel drive motor and the right-wheel drive motor are rotated in the same direction: however, when the left-wheel drive motor and the right-wheel drive motor are rotated at different speeds or in different directions, a direction of travel of the main body may be changed. At least one auxiliary wheel 37 may be further provided to stably support the main body 10.

A plurality of brushes 35 may be further provided on the front side of the lower surface portion of the casing 11, and may each include bristles having a plurality of blades which radially extend. Dust is removed from the floor of the cleaning area due to rotation of the brushes 35, and, in turn, the dust removed from the floor is suctioned through the suction port 10h and then collected in the collection container.

A control panel may be provided on the upper surface of the casing 11, the control panel which includes a manipulation unit 160 to receive various user commands for controlling the robot cleaner 1.

As shown in FIG. 1(a), the detection means includes a sensor unit 150 for detecting an obstacle using a plurality of sensors, and an image acquisition unit 140 and 170 for capturing an image.

As shown in FIG. 1(b), the detection means may include an obstacle detection unit 100 which is provided on the front surface of the body 10 to emit a light pattern and detect an obstacle from a captured image. The obstacle detection unit 100 may include an image acquisition unit 140, and the detection means may include both the obstacle detection unit and the sensor unit 150.

The imaging acquisition unit 140 may be provided to face a ceiling, as shown in FIG. 2 (a), or may be provided to face a forward direction, as shown in FIG. 3(b). In some embodiments, any one image acquisition units 140 may be provided or two image acquisition units respectively facing the forward direction and the ceiling may be provided.

The obstacle detection unit 100 may be provided on the front surface of the main body 10.

The obstacle detection unit 100 may be fixed to the front surface of the casing 11, and may include a first pattern emission unit 120, a second pattern emission unit 130, and an image acquisition unit 140. In this case, the image acquisition unit is basically installed below the pattern emission units, as shown in the drawings, but the image acquisition unit may be disposed between the first and second pattern emission units in some embodiments.

In addition, as described above, a second image acquisition unit 170 may be further provided on the upper surface of the main body. The second image acquisition unit 170 captures an image of the upper surface of the main body, that is, an image of a ceiling.

The main body includes a rechargeable battery 38, and, when a charging terminal 33 of the battery 38 is connected to a commercial power source (e.g., a power plug in the house) or when the main body 10 is docked with a separate charging station 400 connected to the commercial power source, a charging terminal 33 of the battery 38 may be electrically connected to the commercial power source through its contact with a terminal 410 of the charging station. Electrical constituent elements of the moving robot 1 may receive power from the battery 38, and thus, the moving robot 1 may perform autonomous traveling when the battery 38 is charged, even if the robot cleaner 1 is electrically separated from the commercial power source.

FIG. 5 is a block diagram illustrating major components of a moving robot according to an embodiment of the present disclosure.

As illustrated in FIG. 5, the moving robot 1 may include a travel drive unit 250, a cleaning unit 260, a data unit 280, an obstacle detection unit 100, a sensor unit 150, a communication unit 270, a manipulation unit 160, and a controller 200 which controls the overall operation of the mobile robot 1.

The manipulation unit 160 may include at least one of a button, a switch, a touch pad, or the like to receive a user command. The manipulation unit may be provided on the upper surface of the main body 10, as described above.

The data unit 280 may store a detection signal received from the obstacle detection unit 100 or the sensor unit 150, reference data used for an obstacle recognition unit 210 to determine existence of an obstacle, and obstacle information which is information on a detected obstacle. In addition, the data unit 280 may store control data for controlling operation of the moving robot, data generated according to a cleaning mode of the moving robot, and a map including obstacle information generated by a map generator. The data unit 280 may store a basic map, a cleaning map, a user map, and a guide map. An obstacle detection signal includes an ultrasonic/laser detection signal generated by the sensor unit, and an image acquired by the image acquisition unit.

In addition, the data unit 280 may store data readable by a microprocessor, and may include Hard Disk Drive (HDD), Solid State Disk (SSD), Silicon Disk Drive (SDD), Read-Only Memory (ROM), Random-Access Memory (RAM), Compact Disk Read Only Memory (CD-ROM), a magnetic tape, a floppy disk, an optical data storage device, etc.

The communication unit 270 communicates with a terminal (not shown) in a wireless communication method. In addition, the communication unit 270 may be connected to the Internet via a home network to communicate with an external server or a terminal which controls the moving robot.

The communication unit 270 may transmit a generated map to the terminal, receive a cleaning command from the terminal, and transmits data on an operation status of the moving robot and a clean state. The communication unit 270 may include not just a short-range wireless communication module, such as Zigbee and Bluetooth, but Wi-Fi and Wibro to transmit and receive data.

Meanwhile, the terminal is a device which is equipped with a communication module for network access, a program for controlling the moving robot, or an application for controlling the moving robot, and the terminal may be a computer, a laptop, a smartphone, a PDA, a tablet PC, and the like. In addition, the terminal may be a wearable device such as a smart watch.

The travel drive unit 250 includes at least one drive motor to cause the moving robot to travel in accordance with a control command from a travel controller 230. The travel drive unit 250 may include a left-wheel drive motor for rotating the left wheel 36(L), and a right-wheel drive motor for rotating the right wheel 36(R).

The cleaning unit 260 may operate the brushes to facilitate suctioning dust or foreign substances around the moving robot, and may operate a suction device to suction the dust or the foreign substances. The cleaning unit 260 controls operation of the suction fan provided in the suction unit 34, which suctions foreign materials such as dust or waste, so that dust may be drawn into the foreign substance collection container through the suction hole.

The obstacle detection unit 100 includes a first pattern emission unit 120, a second pattern emission unit 130, and an image acquisition unit 140.

The sensor unit 150 includes a plurality of sensors to supplement detecting an obstacle. The sensor unit 150 detects an obstacle existing in front of the main body 10, that is, in a forward direction of travel, using at least one of a laser light, an ultrasonic light, or an infrared light. If a signal transmitted by the sensor unit 150 is reflected and then incident back, the sensor unit 150 inputs a signal including information on the existence of an obstacle or a distance to the obstacle to the controller 200.

In addition, the sensor unit 150 includes a dust sensor 151.

The dust sensor 151 is provided on any one side of the suction hole to detect dust in suctioned air. The dust sensor 151 detects presence, an amount, or a density of dust, and inputs a result of the detection to the controller 200.

For example, the dust sensor may be configured as a plurality of dust sensors, and may detect simply presence of dust in suctioned air or may detect a density of dust for a p[redetermined time by detecting the number of dust particles in the suctioned air. When configured to detect just presence of dust, the dust sensor may count the number of times of detection of dust at every predetermined time unit and determine an amount of dust based on the number of times of detection of dust in each predetermine time unit.

A density of dust in suctioned air for a predetermined period of time may be determined. The dust sensor may detect a density of dust per size, and may detect a density of dust in different categories such as PM 1.0, PM 2.5, and PM 10 according to dust types.

The sensor unit 150 may include at least one inclination sensor (not shown) to detect inclination of the main body. The inclination sensor calculates a direction of inclination and an angle of inclination when the main body is inclined forward, rearward, leftward, or rightward. The inclination sensor includes may include a tilt sensor, an acceleration sensor, and the like, and the acceleration sensor may be any one of gyro type, inertial type, and silicon semiconductor type.

In addition, the sensor unit 150 may detect a floor state of a cleaning region.

The obstacle detection unit 100 is configured such that the first pattern emission unit 120, the second pattern emission unit 130, and the image acquisition unit 140 are provided on the front surface of the main body 10, as described above to emit a light of the first pattern P1 and a light of the second pattern P2 in an region in front of the moving robot and an image is acquired by capturing the light of the emitted patterns.

The obstacle detection unit 100 transmits a detection signal including the acquired image to the controller 200.

Each of the first and second pattern emission units 120 and 130 in the obstacle detection unit 100 may include a light source, and an Optical Pattern Projection Element (OPPE) which generates a predetermined pattern by transmitting light emitted from the light source. The light source may be a laser diode (LD), a light emitting diode (LED), and the like. Laser light has excellent monochromaticity, straightness, and connectivity properties, as compared to other light sources, thereby enabling fine distance measurement, and, particularly, since infrared light or visible light has a high deviation in precision in distance measurement according to factors, such as colors and materials of a target object, it is desired to use the LD as the light source. The OPPE may include a lens or a diffractive optical element (DOE). Depending on the configuration of the respective OPPEs included in the pattern emission units 120 and 130, light in various patterns may be emitted.

The first pattern emission unit 120 may emit a light of the first pattern (P1, which will be hereinafter referred to as a first patterned light) downward and forward from the main body 10. Accordingly, the first patterned light P1 may be emitted to the floor of the cleaning area.

The first patterned light P1 may be in a horizontal line shape. Further, the first patterned light P1 may also be in a cross shape with a horizontal line intersecting a vertical line, but aspects of the present disclosure are not limited to the drawings, and the first patterned light P1 may be in any of various shapes.

The first pattern emission unit 120, the second pattern emission unit 130, and the image acquisition unit 140 may be arranged vertically in a line. The image acquisition unit 140 is provided below the first pattern emission unit 120 and the second pattern emission unit 130, but aspects of the present disclosure are not limited thereto, and the image acquisition unit 140 may be dispose above the first pattern emission unit and the second pattern emission unit.

In some embodiments, the first pattern emission unit 120 is provided on the top to emit the first patterned light P1 downward and forward so as to detect an obstacle located at a position lower than the first pattern emission unit 120, and the second pattern emission unit 130 is provided below the first pattern emission unit 120 to emit a light of the second pattern (P1, which will be hereinafter referred to as a second patterned light) upward and forward. Thus, the second patterned light P2 may be emitted onto an obstacle or a part thereof located at a position higher than at least the second pattern emission unit 130 from a wall or a floor in the cleaning area.

The second pattern light P2 may be different from the first patterned light P1, and desirably include a horizontal line. The horizontal line is not necessarily a continuous line segment and may be a dotted line.

Meanwhile, in the above-described FIG. 2(*b*), an emission angle θh is a horizontal emission angle of the first patterned light P1 emitted by the first pattern emission unit 120, and the emission angle θh represents an angle formed between both ends of the horizontal line and the first pattern emission unit 120, and it is desired to set the emission angle θh in a range of 130° to 140°, but aspects of the present disclosure are not limited thereto. The dotted line of FIG. 2(*b*) represents a direction forward of the mobile robot 1, and the first patterned light P1 may be symmetrical with respect to the dotted line.

Similarly to the first pattern emission unit 120, it is desired to set a horizontal emission angle of the second pattern emission unit 130 in a range of 130° to 140°, and in some embodiments, the second patterned light P2 may be emitted at the same horizontal emission angle as that of the first pattern emission unit 120, and, in this case, the second patterned light P2 may be also symmetrical with respect to the dotted line of FIG. 2(*b*).

The image acquisition unit 140 may acquire a forward image of the main body 10. Particularly, the patterned lights P1 and P2 are displayed on an image acquired by the image acquisition unit 140 (hereinafter referred to as an acquired image), and images of the patterned lights P1 and P2 displayed on the acquired image will be hereinafter referred to as optical patterns, and, because the optical patterns are images formed on the image sensor by the first patterned light P1 and the second patterned light P2 which are incident on an actual space, the same reference numerals as the first patterned light P1 and the second patterned light P2 will be given to a first optical pattern P1 corresponding to the first patterned light P1 and a second optical pattern P2 corresponding to the second patterned light P2.

The image acquisition unit 140 may include a digital camera configured to convert an image of a subject into an electrical signal, convert the electrical signal into a digital signal, and store the digital signal in a memory device, and the digital camera includes an image sensor (not shown) and an image processor (not shown).

The image sensor is a device that converts an optical image into an electrical signal, and is formed as a chip having a plurality of photodiodes integrated therein, and the photodiodes may be, for example, pixels. When light having passed through the lens forms an image on the chip, charges are accumulated in the respective pixels constructing the image, and the charges accumulated in the pixels are converted into an electrical signal (for example, voltage). A Charge Coupled Device (CCD), a Complementary Metal Oxide Semiconductor (CMOS), and the like are well known examples of the image sensor.

The image processor generates a digital image based on an analog signal output from the image sensor. The image processor includes: an A/D converter to convert an analog signal into a digital signal; a buffer memory to temporarily store digital data according to the digital signal output from the A/D converter; and a digital signal processor (DSP) to generate a digital image by processing the data stored in the buffer memory.

The controller 200 include an obstacle recognition unit 210, a map generation unit 220, a travel controller 230, a location recognition unit 240.

The obstacle recognition unit 210 may determine presence of an obstacle based on an acquired image received from the obstacle detection unit 100, and control the travel drive unit 250 so as to pass or avoid the obstacle by changing a direction of travel or a path of travel based on obstacle information.

The travel controller 230 controls the travel drive unit 250 so as to control the left wheel driving motor and the right wheel driving motor independently from each other, such that the main body 10 may move forward or turn.

The obstacle recognition unit 210 stores an obstacle detection signal, received from the sensor unit 150 or the obstacle detection unit 100, in the data unit 280 and determines an obstacle by analyzing the obstacle detection signal.

The obstacle recognition unit 210 determines presence of an obstacle located in the direction of travel based on a signal from the sensor unit, and determines a location, a size, and a shape of the obstacle by analyzing an acquired image.

The obstacle recognition unit 210 extracts a pattern by analyzing the acquired image. The obstacle recognition unit 210 extracts an optical pattern which is obtained by emitting a patterned light onto a floor or an obstacle from the first pattern emission unit or the second pattern emission unit, and determines the obstacle based on the extracted optical pattern.

The obstacle recognition unit 210 detects the optical patterns P1 and P2 from an image (an acquired image) acquired by the image acquisition unit 140. The obstacle recognition unit 210 may detect features, such as dots, lines, sides, and the like, of pixels forming the acquired image, and, based on the detected features, the pattern detection unit 210 may detect the optical patterns P1 and P2, or dots, lines, sides, and the like of the optical patterns P1 and P2.

The obstacle recognition unit 210 may extract a horizontal line forming the first optical pattern P1 and a horizontal line forming the second optical pattern P2 by extracting line segments line segments which are formed by consecutive pixels brighter than neighboring pixels. However, aspects of the present disclosure are not limited thereto, and, using well-known techniques for extracting a desired pattern from a digital image, the obstacle recognition unit 210 may extract the first optical pattern P1 and the second optical pattern P2.

In addition, the obstacle recognition unit 210 determines presence of an obstacle based on the detected patterns, and determines a shape of the obstacle. The obstacle recognition unit 210 may determine an obstacle based on the first optical pattern and the second optical pattern, and calculate a distance to the obstacle. In addition, the obstacle recognition unit 210 may determine a size (height) of an obstacle based on the respective shapes of the first optical pattern and the second optical pattern and a change in an optical pattern occurring during approaching the obstacle.

The obstacle recognition unit 210 may determine an obstacle based on a distance from the first optical pattern and the second optical pattern to a reference position. The obstacle recognition unit 210 may determine that there is a downhill slope when the first optical pattern P1 is located at a position lower than the reference position, and the obstacle recognition unit 210 may determine that there is a cliff when the first optical pattern P1 disappears. In addition, the obstacle recognition unit 210 may determine an obstacle located in a direction of travel or an obstacle located above when the second optical pattern appears.

The obstacle recognition unit 210 determines inclination of the main body based on inclination information received from the inclination sensor included in the sensor unit 150, and, when the main body is inclined, the obstacle recognition unit 210 compensates for the inclination with respect to a position of an optical pattern in an acquired image.

The travel controller 230 controls the travel drive unit 250 to perform cleaning of a region designated from among cleaning regions while traveling in the same area, and controls the cleaning unit 260 to perform the cleaning by suctioning dust during the traveling.

By determining whether the moving robot is allowed to travel or enter with respect to an obstacle recognized by the obstacle recognition unit 210, the travel controller 230 sets a traveling path such that the moving robot travels while approaching the obstacle, travels in the vicinity of the obstacle, passes through the obstacle, or avoids the obstacle, and the travel controller 230 controls the travel drive unit 250 according to the traveling path.

The map generator 220 may generate a map of cleaning regions, based on information on an obstacle determined by the obstacle recognition unit 210.

In an initial operation, if a map of cleaning regions is not stored, the map generator 220 generates the map of cleaning regions based on obstacle information while traveling in the cleaning region. In addition, the map generator 220 may update a pre-generated map based on obstacle information acquired during traveling.

The map generator 220 generates a basic map based on information acquired by the obstacle recognition unit 210 during traveling, and generates a cleaning map by distinguishing the basic map into regions. In addition, the map generator 220 trims distinguished regions of the cleaning map, and generates a user map and a guide map by setting an attribute of each of the distinguished regions.

The basic map is a map in which a shape of a cleaning region obtained during traveling is displayed with an outline, and the cleaning map is a map obtained by distinguishing the basic map into regions. The basic map and the cleaning map include a region allowed for the moving robot to travel, and obstacle information. The user map is obtained by simplifying the regions in the cleaning map and trimming shapes of the outlines of the regions, such that a visual effect is added to the user map. The guide map is a map where the cleaning map and the user map overlap each other. As the cleaning map is displayed on the guide map, a cleaning command may be input based on a region where the moving robot is allowed to travel.

After generating the basic map, the map generator 220 distinguishes the cleaning region into a plurality of regions, and generates a map, which includes connection passages connecting the plurality of regions and information on an obstacle existing in each region. The map generator 220 generates a map with distinguished regions in a manner as follows: the map is distinguished into small regions in order to distinguish the regions on the map, each distinguished small region is set as a detailed region, and each detailed region is incorporated into the representative region.

The map generator 220 processes a shape of each distinguished region. The map generator 220 sets an attribute of each distinguished region, and processes a shape of each distinguished region according to an attribute of each corresponding distinguished region.

The map generator 220 first determines a main region on the basis of the number of portions in each distinguished region overlapping with any other region. The main region is basically set to a living room, but, in some embodiments, the main region may be changed to any one of a plurality of room. The map generator 220 may set attributes of remaining regions with reference to the main region. For example, the map generator 220 may set a region with a size equal to or greater a predetermined size around the living room to a room, and set any other region to an extra region.

When it comes to processing a shape of a region, the map generator 220 processes a shape of each region into a predetermined shape according to a reference depending on an attribute of each corresponding region. For example, the map generator 220 processes a shape of a region with reference to a common house room shape, for example, a square. In addition, the map generator 220 processes a shape of a region in a manner of expanding the shape of the region with reference to the most outer cell in the basic map while deleting or reducing a region not allowed for the moving robot to approach due to an obstacle.

In addition, the map generator 220 displays an obstacle based on a size of the obstacle in the basic map such that an obstacle having a size equal to or greater than a predetermined size is displayed on the map and a cell corresponding to an obstacle having a size smaller than the predetermined size is deleted. For example, on the map, the map generator displays furniture, such as a chair and a sofa, having a size equal to or greater than a predetermined size and deletes a temporarily present obstacle and a small-sized obstacle such as a small toy. When generating a map, the map generator 220 stores a location of a charging station together with the map.

After the map is generated, the map generator 220 may add an obstacle to the map based on obstacle information about a detected obstacle received from the obstacle recognition unit 21. If a particular obstacle is repeatedly detected at a fixed position, the map generator 220 may add the obstacle in the map, and, if an obstacle is temporarily detected, the map generator 220 ignores the obstacle.

In addition, in accordance with a detection signal which is received from the dust sensor 151 included in the sensor unit 150 during traveling, the map generator 220 may add dust information as well as obstacle information in a pre-generated cleaning map. The map generator 220 may distinguish one region into cells of a predetermined size, and store, together with the cleaning map, information on the number of cells in each region and dust information on a per cell basis.

The map generator 220 generates a user map, which is a processed map, and a guide map, which is a map where the user map and the cleaning map overlap each other.

The moving robot performs cleaning based on the cleaning map, and transmits the user map and the guide map to a terminal. A terminal 300 may store and display both the guide map and the user map, and output one of the guide map and the user map according to a setting. When a cleaning command based on the user map or the guide map is received from the terminal 300, the moving robot 1 cleans a designated region by traveling based on the cleaning map. The moving robot stores information on the number of cells in each region and dust information for each region, not on the basis of the user map, but on the basis of the cleaning map which is composed of regions allowed for the moving robot to travel.

The location recognition unit 240 may determine the current location of the main body 10 based on a map (a cleaning map, a guide map, or a user map) stored in the data unit.

When a cleaning command is received, the location recognition unit 240 determines whether a location displayed on the map and the current location of the main body coincide with each other, and, when the current location of the main body does not coincide with the location displayed on the map or when the current location is unknown, the location recognition unit 240 recognizes the current location to restore the current location of the moving robot. When the current location is restored, the travel controller 230 may control the travel drive unit to travel to a designated region based on the current location. The cleaning command may be input from a remote controller (not shown), the manipulation unit 160, or the terminal 300.

When the current location does not coincide with the location displayed on the map or when the current location is unknown, the location recognition unit 240 may estimate the current location based on the map by analyzing an acquisition image received from the image acquisition unit 140.

While a map is generated by the map generator 220, the location recognition unit 240 processes an acquired image acquired at each location and associate the acquired image with the map to thereby recognize the global position of the main body.

The location recognition unit 240 may identify the current location of the main body by comparing a map and an acquired image, acquired by the image acquisition unit at each location on the map, and accordingly, even when the location of the main body is changed all of sudden, the location recognition unit 240 is able to estimate and recognize the current location.

The location recognition unit 240 determines the current location of the main body by analyzing various features located at a ceiling in an acquired image, such as lighting devices, edges, corners, blobs, and ridges. The acquired image may be received from the image acquisition unit or from the second image acquisition unit provided on the upper surface of the main body.

The location recognition unit 240 detects features from each acquired image. There are various well-known feature detection techniques for detecting a feature from an image in the computer vision field. A variety of feature detectors are well known. For example, there are Canny detector, Sobel detector, Harris&Stephens/Plessey detector, SUSAN detector, Shi&Tomasi detector, Level curve curvature detector, FAST detector, Laplacian of Gaussian detector, Difference of Gaussians detector, Determinant of Hessian detector, MSER detector, PCBR detector, and Grey-level blob detector.

The location recognition unit 240 calculates a descriptor based on each feature. For feature detection, the location recognition unit 240 may convert a feature into a descriptor using Scale Invariant Feature Transform (SIFT). The descriptor may be expressed in the form of an n-dimensional vector. The SIFT may detect a feature invariant to scale, rotation, and a change in brightness of a subject, and accordingly, it is possible to detect an invariant (that is, rotation invariant) feature when the same region is imaged by changing the position of the moving robot 1. Of course, aspects of the present disclosure are not limited thereto, and other various techniques (e.g., Histogram of Oriented Gradient (HOG), Haar feature, Ferns, Local Binary Pattern (LBP), and Modified Census Transform (MCT)) may be applied.

Based on descriptor information acquired from an acquired image acquired at each location, the location recognition unit 240 may classify at least one descriptor of the acquired image into a plurality of groups according to a predetermined sub-classification rule, and convert descriptors belonging to the same group into sub-representative descriptors according to a predetermined sub-representation rule. In another example, the location recognition unit 240 may classify all descriptors calculated based on images acquired in a predetermined area into a plurality of groups according to the predetermined sub-classification rule, and convert descriptors belonging to the same group into sub-representative descriptors according to the predetermined sub-representation rule.

Through the above procedure, the location recognition unit 240 may obtain a feature distribution for each location. The feature distribution for each location may be expressed in the form of a histogram or an n-dimensional vector. In another example, without using the predetermined sub-classification rule and the predetermined sub-representation rule, a learning module 143 is able to estimate an unknown current location based on a descriptor calculated from each feature.

In addition, when the current location of the moving robot 1 has become unknown due to location hopping, the location recognition unit 240 may estimate the current location based on data such as a pre-stored descriptor and a sub-representative descriptor.

The location recognition unit 240 acquires an acquired image from the unknown current location using the image acquisition unit 140, and, when various features located at a ceiling, such as lighting devices, edges, corners, blobs, and ridges, are found in the acquired image, the location recognition unit 240 detects the features from the acquired image.

According to a predetermined sub-conversion rule, the location recognition unit 240 may convert information on at least one descriptor obtained from an image acquired at the unknown current location into location information to be compared (e.g., a feature distribution for each location) and comparable information (sub-recognition feature distribution). According to a predetermined sub-comparison rule, a feature distribution for each location may be compared with a corresponding recognition feature distribution to calculate a similarity level for each location. A similarity level (probability) may be calculated at each location, and a location at which the highest probability is calculated may be determined to be the current location.

When a map is updated by the map generator 220 during traveling, the controller 200 transmits the updated information to the terminal 300 via the communication unit so that the same map is stored in the terminal and the moving robot 1. As the same map is stored in the terminal 300 and the moving robot 1, the moving robot 1 is able to clean a designated region in response to a cleaning command from the terminal and the terminal is able to display the current location of the moving robot on the map.

In response to a cleaning command, the travel controller 230 controls the travel drive unit to move to a region designated from among cleaning regions, and operates the cleaning unit so as to perform cleaning while traveling.

In response to a cleaning command for cleaning a plurality of regions, the travel controller 230 controls cleaning by moving regions in a priority order or a preset order of the regions: if there is no set order, the travel controller 230 moves to a nearby region or an adjacent region with reference to the current location and performs cleaning.

In addition, in response to a cleaning command for cleaning a random region regardless of whether regions are distinguished, the travel controller 230 moves to a region included in the random region and performs cleaning.

When a virtual wall is set up, the travel controller 230 controls the travel drive unit to travel based on coordinates received from the map generator by avoiding the virtual wall. Even though it is determined by the obstacle recognition unit 210 that no obstacle is present, if a virtual wall is set up, the travel controller 230 recognizes an obstacle as being present at a location corresponding to the virtual wall and restricts traveling.

In response to a cleaning command, the travel controller 230 sets a cleaning region and set a path of cleaning of the cleaning region. The travel controller 230 may set a cleaning region based on cleaning data calculated based on dust information and the number of times of cleaning, and set a cleaning path for the cleaning region.

For example, when a cleaning command for cleaning an entire area is received, the travel controller 230 sets a cleaning region to be cleaned and a non-cleaning region not to be cleaned, based on numbers in cleaning data, and then the travel controller 230 sets a cleaning path. In some embodiments, the travel controller may add cleaning of a particular region. The travel controller may set a less dusty region as a non-cleaning region or may set even the less dusty region as a cleaning region depending on the number of times the region has been set as a non-cleaning region or an elapse of time since the previous cleaning. That is, the travel controller may prevent a less dusty region from being cleaned repeatedly and also allow the less dusty region to be cleaned when a preset time elapsed, thereby maintaining an entire area in a constant clean state.

If a cleaning region or a cleaning order is set by a user, the travel controller 230 performs cleaning according to the setting. The travel controller 230 may transmit information on a cleaning situation as to a region not to be cleaned based on cleaning data to a terminal so as to guide cleaning of the region. For example, if there is a region that has not been cleaned for a predetermined time, the travel controller 230 may output cleaning guidance to perform cleaning, regardless of an amount of dust.

If cleaning of a designated region is completed, the controller 200 stores a record of the cleaning in the data unit.

In addition, the controller 200 accumulates and stores dust information detected during cleaning, counts the number of times of cleaning in each region, calculates cleaning data based on the number of times of cleaning in each region and an amount (density) of dust in each region, and then sets a cleaning region based on the cleaning data in the next time of cleaning.

The controller 200 calculates cleaning data based on the number of cells in each region, the number of cells where dust is detected, and the number of times of cleaning (the number of visits), and the controller 200 stores the cleaning data. The controller 200 calculates the cleaning data by combining newly detected data and pre-accumulated data.

For example, the controller 200 may calculate cleaning data by dividing the number of cells where dust is detected by a value obtained by multiplying the number of cells in each region by the number of times of cleaning. The cleaning data may further include another variable, and how to calculate the cleaning data may be changed.

The controller may accumulate and store, in the data unit, the number of cells in each region, dust information, and the number of times of cleaning, and reset such data every preset period of time or when the environment of the region changes. For example, when the number of cells in a region is changed due to a new obstacle, such as installation of new furniture in the region, the controller may determine that the environment has changed, and thus reset data.

The controller 200 transmits an operation state of the moving robot 1 or a clean state in a predetermined period of time to the terminal 300 via the communication unit 190.

Based on data received from the moving robot 1, the terminal 300 displays a location of the moving robot together with a map on a screen of an application in execution, and outputs information on a clean state. Based on the data received the moving robot, the terminal 300 may display, on the screen, information on an amount/density of dust and the number of times of cleaning has been performed.

The terminal 300 may display one of a user map and a guide map according to a setting, and change the displayed one to the other according to a setting.

The terminal 300 may display a received map on the screen, and, in response to a key input or a touch input, the terminal 300 may distinguish or incorporate regions and change or add an attribute of a region. In addition, the terminal may designate a location of a particular obstacle on the map, and information on the designated obstacle is transmitted to the moving robot and added in a pre-stored map.

In response to a key input or a touch input, the terminal 300 may designate a cleaning region on a displayed map and set an order in which cleaning is to be performed, and transmit a cleaning command to the moving robot.

In addition, based on data received from the moving robot, the terminal 300 shows a clean state on a displayed map (the user map and the guide map). When information on an obstacle is added, the terminal updates the map based on the received data and displays the updated map.

In addition, when a charging station is detected based on a return signal from the charging station, the controller 200 recognizes the current location of the moving robot, calculates a location of the charging station based on the current location of the moving robot, and stores the location of the charging station. The controller 200 may perform setting to display the location of the charging station on the map.

FIG. 6 is a diagram illustrating an example of how to generate a map and distinguish regions by a moving robot according to an embodiment of the present disclosure.

As illustrated in (a) of FIG. 6, when no map is stored, the moving robot 1 may generate a map using a wall following technique while traveling in a traveling area X1.

As illustrated in (b) of FIG. 6, the map generator 220 generates a map as shown in (c) of FIG. 6 by distinguishing a traveling area X1 into a plurality of regions A1' to A9'. The generated map is stored in the data unit 280 and transmitted to the terminal 200 via the communication unit 270.

The map generator 220 may distinguish a traveling area into a plurality of regions by a predetermined criterion. The traveling area may be defined as a range including all areas on any plane previously travelled by the moving robot and all areas on a plane currently being travelled by the moving robot 1.

For region distinction, the map generator 220 distinguishes the traveling area X1 into small regions and large regions, and generates a map accordingly. The map generator 220 may distinguish the traveling area into a plurality of small regions, and each small region may be distinguished on the basis of each chamber (room) in the traveling area. In addition, the map generator may distinguish the traveling area into a plurality of large regions which are distinguished from each other on the basis of a travel capability. For example, two indoor spaces completely separated from each other by a moving line may be distinguished as two large regions. In another example, even the same indoor space may be distinguished into the large regions on the basis of floors of the travel area.

After distinguishing regions, the map generator 220 generates a map (a user map), as shown in (c) of FIG. 6, by trimming the outline of the regions. When a region in a cleaning map has a size equal to or greater than a predetermined size, the region may be distinguished into a plurality of regions. For example, a region A3' may be distinguished into a region A3 and a region A4.

The terminal 300 executes an application and displays a received map on a screen. In this case, a plurality of distinguished regions (A1 to A9) is displayed differently. The plurality of regions (A1 to A0) in the map may be displayed with different colors or different names.

The moving robot and the terminal basically store the same map, but the terminal displays a user map with simplified regions, as shown in (c) of FIG. 6, to allow a user to easily recognize the regions, and the moving robot performs traveling and cleaning based on a cleaning map, as shown in (b) of FIG. 6, including information on an obstacle. In order to display the obstacle even in (c) of FIG. 6, a guide map where the cleaning map and the user map overlap each other may be displayed.

As described above, the moving robot performs cleaning based on the cleaning map as shown in (b) of FIG. 6.

When a cleaning command is received, the moving robot 1 determines the current location thereof based on the stored cleaning map, and, when the current location coincides with a location displayed on the map, the moving robot 1 performs designated cleaning, and, when the current location does not coincide with the location displayed on the map, the moving robot 1 recognizes and restores the current location and then performs cleaning. Accordingly, no matter where the moving robot 1 may be located in the plurality of regions (A1 to A9), the moving robot 1 is able to determine the current location thereof, move to a designated region, and then perform cleaning.

As illustrated in the drawing, the remote controller or the terminal may select at least one of the plurality of regions (A1 to A9) and input a cleaning command to the moving robot 1. In addition, the moving robot 1 may set any one region as a cleaning region or may set a cleaning region by touching or dragging the plurality of regions without distinguishing therebetween.

When a cleaning command for the plurality of regions is received, any one of the plurality of regions may be set as a first priority region, cleaning may be performed in the first priority region first and then in a region in the vicinity of the first priority region, or the order in which cleaning is to be performed may be set. When the order in which cleaning is to be performed in a plurality of designated regions is set, the moving robot 1 may perform cleaning by moving according to the set order. When there is no set order in which cleaning is to be performed in a plurality of cleaning regions, the moving robot 1 moves a region closest to the current location of the moving robot 1 and performs cleaning.

FIG. 7 is a diagram referred to for explaining how to distinguish cells in each region by a moving robot according to an embodiment of the present disclosure.

As illustrated in FIG. 7, the moving robot distinguishes one region into a plurality of cells, detects dust information on a per cell basis, and stores such dust information.

As illustrated in the drawing regarding the first region A1, the number of cells in a region allowed for the moving robot to travel, that is, a region shown in the cleaning map, is counted.

The dust sensor detects dust during traveling and transmits a result of the detection to the controller 200, and the controller 200 stores dust information in response to a detection signal from the dust sensor with respect to each region on a per cell basis. Based on a detection signal depending on the type of the dust sensor, the controller 200 may store presence of dust on a per cell basis or may store a density of dust on a per cell basis.

The controller 200 may change a cell size depending on the type of the dust sensor and the detection method of the moving robot, but it is desirable to set the cell size based on a size of the moving robot 1. The controller 200 sets every cell in each region to have an identical size, and counts the number of cells in each region. The controller 200 sets the cell size corresponding to the size of the moving robot 1, and stores dust information in response to a detection signal from the dust sensor in each cell.

In response to a received cleaning command, the controller 200 performs cleaning of the traveling area by setting a cleaning region based on cleaning data, which is calculated based on dust information and the number of times of cleaning.

As described above, the controller 200 calculates cleaning data based on dust information, the number of cells in each region, the number of cells where dust is detected, and the number of times of cleaning. The controller 200 may determine a dusty level based on a ratio between the number of cells in a region and the number of cells where dust is detected in the region. In addition, using a dust density stored on a cell basis, the controller 200 may calculate cleaning data.

If cleaning data has a greater value, the controller 200 determines that a corresponding region has more dust and needs to be cleaned often, and if cleaning data has a smaller value, the controller 200 determines that a corresponding region has less dust and does not needs to be cleaned often. In some embodiments, if cleaning data has a value equal to or greater than a predetermined value, the controller 200 may set additional cleaning.

The controller 200 may determine the order in which cleaning is to be performed, based on a value of cleaning data.

The cleaning data is a value which is obtained in consideration of both an amount of dust and the number of times of cleaning, and thus, the controller 200 may set a region as a cleaning region based on cleaning data and based on whether the region meets a predetermined condition, although a small amount of dust present in the region.

For example, even though there is a small amount of dust in a region, if the number of times of cleaning in the region is equal to or smaller than a predetermined value or if a predetermined time has elapsed since last cleaning, the controller 200 sets the region as a cleaning region, and, in particular, if the region was set as a non-cleaning region, the controller 200 set the region as a cleaning region in the last cleaning, regardless of an amount of dust, so that there is no region left uncleaned for a predetermined period of time. In addition, even though there is a small amount of dust in a region, if the number of cells with a density of dust equal to or greater than a reference value in the region is equal to or greater than a predetermined value, the controller 200 may set the region as a cleaning region so as to perform cleaning of the region.

The controller 200 performs control such that a dusty region is cleaned often, a less dusty region is set as a non-cleaning region so as not to be cleaned unnecessarily, and even the less dusty region is cleaned within a predetermined period of time, and accordingly, the entire traveling area may be maintained in a constant clean state.

As illustrated in the following Table 1, cleaning may be set by calculating cleaning data. The following Table 1 includes an extreme example to describe how to set a cleaning region based on cleaning data, and Table 1 may be different from actual measurements.

TABLE 1

| Region | Number of cells | Cells where dust is detected | Number of times of cleaning | Cleaning data |
|---|---|---|---|---|
| A | 120 | 110 | 4 | 0.229 |
| B | 80 | 70 | 2 | 0.438 |
| C | 105 | 30 | 3 | 0.095 |

As illustrated in Table 1, Region A has the highest values in terms of the number of cells and the number of cells where dust is detected (the greatest amount of dust), but the number of times of cleaning in Region A is 4, and thus, cleaning data for Region A is calculated into 0.229 which is the second highest value.

Region B has the second highest values in terms of the number of cells and the number of cells where dust is detected, but the number of times of cleaning has been performed in Region B is a small value, and thus, the cleaning data for Region B is calculated into 0.438 which is the highest value, and therefore, Region B may be determined to be a region most in need of cleaning.

Meanwhile, Region C has the lowest values in terms of the number of cells and the number of cells where dust is detected, but the number of times of cleaning in Region C is greater than that of Region B, and therefore, cleaning data for Region C is calculated into a very low value.

Accordingly, the controller 200 may set Region A and Region B as cleaning regions and Region C as a non-cleaning region, so that cleaning is performed only in Region A and Region B. Meanwhile, even though cleaning data for Region C is calculated into a low value, if Region C was set as a non-cleaning region in last cleaning, the controller 200 may set Region C as a cleaning region so as to clean Region C.

When it comes to determining the number of times a region has been set as a non-cleaning region, the controller 200 may variably apply the determination according to a setting, and the controller 200 may set a cleaning region depending on an elapse of time since last cleaning. In addition, even though the cleaning data for Region C has the lowest value, if a cell with a density of dust equal to greater than a reference density is included in Region C or if the number of cells with a density of dust equal to or greater than a reference density in Region C is equal to or greater than a predetermined value, the controller 200 may set Region C as a cleaning region, regardless of the cleaning data.

In addition, after setting a cleaning region, the controller 200 may determine that a region having cleaning data equal to or greater than a reference value is highly contaminated, and additionally set the region to be cleaned.

FIG. 8 is a diagram referred to for explaining a detection method in response to movement of a moving robot according to an embodiment of the present disclosure.

As illustrated in FIG. 8, while traveling between two regions out of a plurality of regions, the moving robot 1 may perform cleaning of a region A10 included in a traveling path or may not perform cleaning of the region A10 after cleaning once or twice.

The travel controller may set the region A10 to be cleaned, and travel in the moving region A10 while performing cleaning, or may pass the region A10 quickly after cleaning once. The travel controller may perform control such that dust information detected during cleaning is measured once for each cell included in the region A10. In addition, after the region A10 is cleaned once, if an amount of dust equal to or greater than a predetermined value is detected in the second round of traveling in the region A10, the travel controller performs control such that the region A10 is cleaned again but only the dust information detected in the first round of cleaning is stored.

For example, when moving from a first region A1 to a second region A2, the moving robot passes through a seventh region A7, and, even when moving from the second region to a third region A3, the moving robot passes through the seventh region A7, and accordingly, the travel controller performs control such that dust information for a corresponding region is stored once on a per cell basis.

FIG. 9 is a diagram referred to for explaining a change in environment of a region with respect to a moving robot according to an embodiment of the present disclosure.

As illustrated in FIG. 9, the travel controller 230 stores information on an obstacle detected by the obstacle detection unit 100 during traveling. The map generator updates a pre-generated map based on a newly detected obstacle.

The travel controller 230 stores dust information for each region and the number of times of cleaning in each region, and, if an obstacle having a size equal to or greater than a predetermined size is detected in a region, the number of cells in the region is changed, and thus, in this case, the travel controller 230 may reset dust information pre-stored in the data unit.

In addition, the travel controller 230 may reset data, stored in the data unit, in a predetermined period of time, for example, every month, every three month (quarter), and every year, such that the recent data is used.

As illustrated in the drawings, if a changed region A11 occurs due to a new obstacle present in the first region A1, for example, if a region as large as the changed region A11 is not allowed for the moving robot to travel due to installation of new furniture, the total number of cells in the first region is changed, and thus, the controller 200 may reset dust information, and accumulate and store new detected data. If the number of cells is changed, the number of cells where dust is detected is changed and thus it is desired to reset dust information.

Even though an obstacle is equal to or greater than a predetermined size, the controller 200 may not reset data immediately and instead may reset the data after determining whether the obstacle is detected a predetermined number of times.

In addition, even though a new obstacle is detected, if the obstacle is smaller than the predetermined size and not detected in the next time, for example, if a pet is detected, the controller 200 ignores the detected obstacle and maintains the number of cells and dust information for each of the cells, because the pet is a moving subject and does not stay in one place all the time.

FIG. 10 is a flowchart illustrating a cleaning method of a moving robot according to an embodiment of the present disclosure.

As illustrated in FIG. 10, the moving robot starts to clean a traveling area in accordance with a cleaning command received from a remote controller, a manipulation unit, or a terminal (S310).

The moving robot 1 checks cleaning data calculated based on pre-stored data, which includes dust information and the number of times of cleaning, (S320), and sets a cleaning region based on the cleaning data.

The controller 200 performs control such that a dusty area is set to be cleaned often, a less dusty area is set as a non-cleaning area so as not to be cleaned unnecessarily, and even the less dusty region is cleaned within a predetermined period of time, and accordingly, the entire traveling area may be maintained in a constant clean state.

As described above, as cleaning data is a value obtained in consideration of both an amount of dust and the number of times of cleaning, the controller 200 may set a cleaning region based on the cleaning data, and may set even a less dusty region as a cleaning region based on whether a predetermined condition is met. When there is a smaller amount of dust and a smaller number of times of cleaning, the cleaning data is calculated to be high, and, when there are a larger amount of dust and a larger number of times of cleaning, the cleaning data may be calculated to be low. Even though there is a large amount of dust, if cleaning has been performed a great number of times, the cleaning data may be calculated to be low, and, even though there is a small amount of dust, if cleaning has been performed a small number of times, the cleaning data may be calculated to be high (a great value).

Accordingly, the controller 200 sets a cleaning region based on cleaning data, and, if cleaning data for a region is equal to or smaller than a predetermined value, the controller 200 may set the corresponding region as a non-cleaning region to be excluded from the upcoming cleaning operation. Even though cleaning data for a region is low, the controller 200 may set the corresponding region as a cleaning region depending on the number of times that the corresponding region has been set as non-cleaning regions, an elapse of time (hours) since last cleaning, and a density of dust in each cell.

In addition, if cleaning data for a region is equal to or greater than a set value, the controller 200 may determine that the region is highly contaminated, and may set additional cleaning.

If cleaning regions are set, the controller 200 sets a cleaning path that connects cleaning regions (S340). The controller 200 may set a cleaning path to first travel to a region with the highest cleaning data, and may set a cleaning path depending on a distance between cleaning regions.

The controller 200 applies a control command to the travel drive unit and the cleaning unit so as to perform cleaning while traveling in a cleaning region according to a setting. In addition, the controller 200 applies a control command to the sensor unit 150 so as to detect dust using the dust sensor during cleaning.

The dust sensor inputs a detection signal to the controller 200 by detecting dust in the air suctioned during cleaning.

The controller 200 increases the number of times of cleaning in each region, and stores dust information for each region based on a detection signal indicative of detection of dust in each cell (S360). The controller 200 may store the number of cells in each region and the number of cells where dust is detected, and store a dust density for each region on a per cell basis. In some embodiments, the controller 200 may store information on a cell with a density of dust equal to or greater than a reference density.

When cleaning of every cleaning region is completed (S370), the controller 200 accumulates and stores data for each region in the data unit, and calculates and updates cleaning data based on the number of cells, the number of cells where dust is detected, and the number of times of cleaning (S380). The controller 200 may calculate cleaning data after completion of cleaning or before start of cleaning.

FIG. 11 is a flowchart illustrating a method of setting a cleaning region by a moving robot according to an embodiment of the present disclosure.

As illustrated in FIG. 11, the controller 200 checks cleaning data (S410) to set a cleaning region.

The controller 200 determines whether cleaning data for each region has a value equal to or greater than a reference value (S420), and, if cleaning data for a region has value equal to or greater than the reference value, the controller 200 sets the region as a cleaning region (S480).

If the cleaning data for the corresponding region has a value equal to or greater than the reference and also equal to or greater than a preset value set greater than the reference value, the controller 200 may add cleaning of the corresponding region (S450).

Meanwhile, if cleaning data for a region has a value smaller than the reference value, the controller 200 determines whether the number of times of exclusion of each region is equal to or greater than a preset number of times (S430).

Even though cleaning data for a region has a value smaller than the reference value, if the number of times of exclusion of the region is equal to or greater than the preset number of times, the controller 200 sets the region as a cleaning region (S480).

For example, the preset number of times may be set to 1 or 3, and, if the preset number of times is 1 and a corresponding region has been once excluded from cleaning, the controller 200 unconditionally sets the corresponding region as a cleaning region in the next cleaning operation.

In addition, if cleaning data for a region is smaller than the reference value and the number of times of exclusion of the region is smaller than the preset number of times, the controller 200 determines whether a dust density on a per cell basis is equal to or greater than a reference density (S460).

If the number of cells with a density of dust equal to or greater than the reference density is equal to or greater than a preset value, the controller 200 sets the cells as cleaning regions (S480).

In addition, the controller 200 determines if a preset time has elapsed since last cleaning (S470), and, if so, the controller 200 sets the corresponding cells as cleaning regions (S480).

The controller 200 may, regardless of order, make determinations as to the number of times of exclusion, a density of dust in each cell, and an elapse of time since last cleaning, and may apply the determinations to set a cleaning region. That is, if cleaning data for a region is smaller than the reference value and the preset time has elapsed since last cleaning, the region may be set as a cleaning region, regardless of whether the preset time has elapsed since last cleaning.

Meanwhile, the controller 200 sets a region as a non-cleaning region (S485) when cleaning data for the region has a value smaller than the reference value, when the number of times of exclusion is smaller than the preset number of times, when there is no cell with a density of dust equal to or greater than the reference density (or the number of such cells being smaller than a preset value), and when the preset time has not elapsed since last cleaning.

After determination as to a cleaning region and a non-cleaning region is made, the controller 200 may set a cleaning path which connects cleaning regions (S490), and controls the travel drive unit and the cleaning unit to perform cleaning while traveling in the cleaning regions.

FIG. 12 is a flowchart illustrating a method of updating data by a moving robot according to an embodiment of the present disclosure.

As illustrated in FIG. 12, the controller 200 stores a detection signal received from the dust sensor during cleaning as cleaning information for each region (S510).

In addition, the controller 200 stores information on an obstacle detected during cleaning, and updates a cleaning map.

The controller 200 stores dust information for each region and the number of times of cleaning in each region, and, when an obstacle in size equal to or greater than a predetermined size is detected in a region, the number of cells in the region is changed, and thus, the controller 200 may reset dust information pre-stored in the data unit.

When there is a change in the environment of any one region (S520), for example, when an obstacle in size equal to or greater than a predetermined size is detected, the controller 200 may determine there is a change in the environment. In addition, even when a region has expanded due to removal of a pre-existing obstacle, the controller 200 may determine that there is a change in the environment.

When an obstacle in size equal to or greater than the predetermined size is detected in a region, the number of cells in the region is changed, and thus, the controller 200 may reset data accumulated in the data (S540). In this case, out of dust information for the region and number of times of cleaning in the region, which are pre-stored in the data unit, the controller 200 may reset only dust information or reset both the dust information and the number of times of cleaning.

For example, since the moving robot is not allowed to travel in a region in size equal to or greater than a predetermined size due to additional installation of furniture in the region, the number of cells in the region is changed, and thus, dust information for the region is reset. However, even though an obstacle is detected, if there is no change in a traveling region, the obstacle may be ignored, and, since such an obstacle is possibly a temporary obstacle, data may not be reset immediately and instead dust information may be reset after determination as to whether the obstacle is detected a predetermined number of times.

Meanwhile, even though a new obstacle is detected in a region, if the obstacle has a size equal to or smaller than a predetermined size and is not detected later, for example, when the obstacle is a moving obstacle such as a pet, the controller 200 may maintain the number of cells in the region and dust information for the region.

In addition, the controller 200 may reset data stored in the data unit, for example, every month, every three month, or every year, so that the most recent data is used (S530).

The controller 200 resets data by deleting data which has been stored for more than a preset time (S550). For example, when cleaning data is set to be calculated based on data of the latest three months, the controller 200 deletes data which has been stored for more than three months, and maintains only data which has been stored for three months or less.

The controller 200 calculates cleaning data (SS560) based on an amount of dust (density of dust) and the number of times of cleaning, which are on the basis of data newly detected during cleaning and data accumulated within a period of time, and the controller 200 stores the calculated cleaning data in the data unit (S570).

Thus, the moving robot of the present disclosure stores dust information detected during cleaning, and set a region as a cleaning region or a non-cleaning region based on the dust information and the number of times of cleaning in the region, so that the region is prevented from being cleaned redundantly and the whole regions are maintained in a constant clean state. Accordingly, the moving robot does not clean a region unnecessarily redundantly and does not allow a region left uncleaned, thereby improving cleaning efficiency.

The foregoing description is merely illustrative of the technical features of the moving robot of the present disclosure, and various modifications and variations can be made by those having ordinary skill in the art without departing from the essential characteristics of the present disclosure.

What is claimed is:

1. A moving robot comprising:
a movable main body;
wheels configured to move the main body;
a dust sensor configured to detect dust in air suctioned during cleaning;
a memory configured to store data for a plurality of regions, a total number of cells in each region among the plurality of regions and a number of cells where dust is detected by the dust sensor in each region among the plurality of regions as dust information; and
a controller configured to:
control the wheels to perform cleaning while traveling in a traveling area distinguished into the plurality of regions;
distinguish each region allowed for traveling in the plurality of regions into the cells of a predetermined size;
store, in the memory, the dust information detected by the dust sensor and a number of times of cleaning for each region among the plurality of regions;
set a cleaning region and a non-cleaning region based on cleaning data, which is calculated based on the dust information and the number of times of cleaning for each region among the plurality of regions, to perform cleaning of the cleaning regio; and
when the cleaning data for a specific region among the plurality of regions has a value smaller than a reference value, set the specific region as the cleaning region based on a number of times the specific region has been set as the non-cleaning region, a density of dust in each the cells in the specific region, or an amount of time elapsed since the specific region was last cleaned.

2. The moving robot of claim 1, wherein the controller is further configured to, in response to a detection signal from the dust sensor, count a number of cells in the specific region where dust is detected.

3. The moving robot of claim 1, wherein the controller is further configured to calculate the cleaning data based on dividing a total number of cells in the specific region where dust is detected by a value obtained by multiplying a total number of cells in the specific region by a number of times the specific region has been cleaned.

4. The moving robot of claim 1, wherein the controller is further configured to:
when the cleaning data has a value equal to or greater than the reference value, set the specific region as the cleaning region; and
when the cleaning data has a value smaller than the reference value, set the specific region as the non-cleaning region.

5. The moving robot of claim 4, wherein the controller is further configured to, when the cleaning data has a value greater than a preset value, set the specific region as the cleaning region, and
wherein the preset value is greater than the reference value.

6. The moving robot of claim 1, wherein the controller is further configured to, when a total number of cells in the specific region has changed, reset pre-stored data for the specific region.

7. The moving robot of claim 6, further comprises an image acquisition sensor,
wherein the controller is further configured to, when a new obstacle is detected by the image acquisition sensor or when an obstacle is removed, determine that the total number of cells in the specific region has changed.

8. The moving robot of claim 7, wherein the controller is further configured to reset the data for the specific region by determining whether the new obstacle is a temporary obstacle or whether the new obstacle has a size equal to or greater than a predetermined size.

9. The moving robot of claim 1, wherein the controller is further configured to delete data for the specific region that has been stored for more than a preset amount of time.

10. A controlling method of a moving robot, the method comprising:
receiving a cleaning command with respect to a traveling area divided into a plurality of regions;
distinguishing each region allowed for traveling in the plurality of regions into cells of a predetermined size;
checking cleaning data for a specific region among the plurality of regions which is calculated based on a number of times the specific region has been cleaned and dust information for the specific region including a total number of cells in the specific region and a number of cells in the specific region where dust is detected by a dust sensor in the moving robot;
setting a cleaning region and a non-cleaning region by comparing the cleaning data for the specific region with a reference value;
when the cleaning data for the specific region has a value smaller than the reference value, setting the specific region as the cleaning region based on a number of times the specific region has been set as the non-cleaning region, a density of dust in each of the cells in the specific region, or an amount of time elapsed since the specific region was last cleaned;
performing cleaning of the cleaning region while traveling;
storing dust information by detecting dust in air suctioned during cleaning; and
updating the cleaning data for the specific region based on the number of times of the specific region has been cleaned and the dust information.

11. The method of claim 10, further comprising adding cleaning of the specific region when the cleaning data of the specific region has a value greater than the reference value.

12. The method of claim 10, further comprising:
before setting the specific region as the non-cleaning region in a situation where the cleaning data of the specific region has a value smaller than the reference value, setting the specific region as the cleaning region when at least one of the following conditions is met:
the specific region has been set as the non-cleaning region a preset number of times or more;
there is a cell in the specific region with a density of dust equal to or greater than a reference density; and
a preset amount of time has elapsed since the specific region was last cleaned.

13. The method of claim 10, further comprising:
detecting an obstacle in the specific region during cleaning; and when the total number of cells in the specific region has changed due to the obstacle, resetting pre-stored data for the specific region.

14. The method of claim 13, further comprising determining that the total number of cells in the specific region has changed when a new obstacle is detected by an image acquisition sensor or when an obstacle has been removed from the specific region.

15. The method of claim 14, wherein the pre-stored data is reset when the new obstacle is not a temporary obstacle and when the new obstacle has a size equal to or greater than a predetermined size.

16. The method of claim 10, further comprising:
deleting data, which includes previous dust information that has been stored for more than a preset amount time and a number of times the specific region has been cleaned.

17. The method of claim 10,
wherein the cleaning data for the specific region is calculated based on dividing the number of cells where the dust is detected by a value obtained by multiplying the number of cells in the specific region by the number of times the specific region has been cleaned.

18. The method of claim 10, wherein the cleaning data is calculated to be higher as there is a larger amount of dust and a smaller number of times of cleaning, and
wherein the cleaning data is calculated to be lower as there is a smaller amount of dust and a larger number of times of cleaning.

* * * * *